(12) United States Patent
Merker et al.

(10) Patent No.: US 12,222,813 B2
(45) Date of Patent: Feb. 11, 2025

(54) DEVICE AND METHOD FOR CONTROLLING A TECHNICAL SYSTEM

(71) Applicant: Robert Bosch GmbH, Stuttgart (DE)

(72) Inventors: Andreas Merker, Vaihingen/Enz (DE); Axel Aue, Korntal-Muenchingen (DE); Franz Nottensteiner, Moessingen (DE); Jerome Parlebas, Burgstetten (DE); Matthias Schreiber, Vaihingen/Enz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 5 days.

(21) Appl. No.: 17/910,804

(22) PCT Filed: Apr. 12, 2021

(86) PCT No.: PCT/EP2021/059371
§ 371 (c)(1),
(2) Date: Sep. 10, 2022

(87) PCT Pub. No.: WO2021/213821
PCT Pub. Date: Oct. 28, 2021

(65) Prior Publication Data
US 2023/0121675 A1    Apr. 20, 2023

(30) Foreign Application Priority Data
Apr. 23, 2020 (DE) .................. 10 2020 205 146.1

(51) Int. Cl.
*G06F 11/00*  (2006.01)
*G06F 11/07*  (2006.01)
*G06F 11/14*  (2006.01)

(52) U.S. Cl.
CPC ...... *G06F 11/1441* (2013.01); *G06F 11/0724* (2013.01); *G06F 11/0739* (2013.01)

(58) Field of Classification Search
CPC ............ G06F 11/0724; G06F 11/0739; G06F 11/1441
See application file for complete search history.

(56) References Cited

U.S. PATENT DOCUMENTS

| 10,127,161 | B2* | 11/2018 | Wegner | G06F 11/0724 |
| 10,585,755 | B2 | 3/2020 | Yamamoto | |
| 2013/0238882 | A1* | 9/2013 | Suzuki | G06F 11/1438 |
| | | | | 712/228 |
| 2013/0339663 | A1* | 12/2013 | Chang | G06F 11/0709 |
| | | | | 712/29 |
| 2014/0053019 | A1* | 2/2014 | Holley | G06F 11/2092 |
| | | | | 714/E11.061 |
| 2014/0351279 | A1* | 11/2014 | Hoshina | G06F 16/904 |
| | | | | 707/758 |
| 2015/0058682 | A1* | 2/2015 | Nagumo | G06F 11/0724 |
| | | | | 714/47.3 |

(Continued)

FOREIGN PATENT DOCUMENTS

| DE | 102007045398 A1 | 4/2009 |
| DE | 102013224702 A1 | 6/2015 |

(Continued)

OTHER PUBLICATIONS

International Search Report for PCT/EP2021/059371, Issued Jul. 22, 2021.

(Continued)

*Primary Examiner* — Joshua P Lottich
(74) *Attorney, Agent, or Firm* — NORTON ROSE FULBRIGHT US LLP; Gerard A. Messina

(57) ABSTRACT

A method for controlling a technical system, in particular of a motor vehicle.

13 Claims, 2 Drawing Sheets

(56) References Cited

U.S. PATENT DOCUMENTS

| | | | |
|---|---|---|---|
| 2016/0283338 A1* | 9/2016 | Ramalingam | G06F 3/0632 |
| 2017/0357560 A1* | 12/2017 | Fukuda | G06F 11/22 |
| 2018/0105183 A1* | 4/2018 | Kollmer | G06F 11/0739 |
| 2018/0181124 A1* | 6/2018 | Fukuda | G06F 11/302 |
| 2019/0155679 A1 | 5/2019 | Kim et al. | |
| 2020/0372346 A1* | 11/2020 | Wu | G06F 11/3055 |
| 2021/0124655 A1* | 4/2021 | Birnie | G06F 11/1471 |
| 2023/0102089 A1* | 3/2023 | Bellubbi | G06F 11/0757 714/55 |

FOREIGN PATENT DOCUMENTS

| | | | |
|---|---|---|---|
| EP | 2210153 B1 | 4/2013 | |
| KR | 101560497 B1 | 10/2015 | |
| WO | 2013101082 A1 | 7/2013 | |

OTHER PUBLICATIONS

Anonymous, "Logical Partition," Wikipedia, 2020, pp. 1-4. <https://en.wikipedia.org/w/index.php?title=Logical_partition&oldid=951198579>.

Anonymous, "Hardware Acceleration," Wikipedia, 2020, pp. 1-8. <https://en.wikipedia.org/w/index.php?title=Hardware_acceleration&oldid=940497825>.

Anonymous, "System Monitor," Wikipedia, 2020, pp. 1-5. <https://en.wikipedia.org/w/index.php?title=System_monitor&oldid=951111279>.

Anonymous, "Real-Time Computing," Wikipedia, 2020, pp. 1-7. <https://en.wikipedia.org/w/index.php?title=Real-time_computing&oldid=952292102>.

* cited by examiner

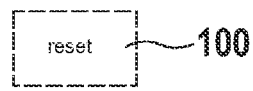  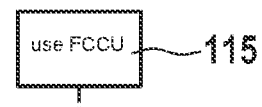
 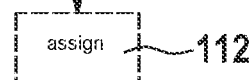 
FIG. 3A  FIG. 3B  FIG. 3C
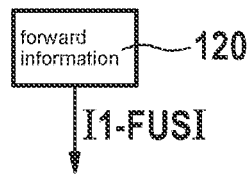 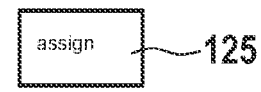 
FIG. 3D  FIG. 3E  FIG. 3F
 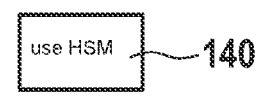 
FIG. 3G  FIG. 3H  FIG. 3I

DEVICE AND METHOD FOR CONTROLLING A TECHNICAL SYSTEM

BACKGROUND INFORMATION

There are control devices that control partial functions of a technical system, e.g., of a vehicle. These respectively control certain sub-functions and/or associated applications.

SUMMARY

Preferred embodiments of the present invention relate to a device for controlling a technical system, e.g., of a vehicle.

Further preferred embodiments of the present invention provide that the device comprises: a computer comprising at least one core, a memory assigned to the computer for at least temporarily storing at least one of the following elements: a) data, b) a computer program, in particular for executing a method according to the embodiments. In further preferred embodiments, the computer program may also characterize at least one application (hereinafter also called "application") executed on the computer, e.g., for controlling the technical system.

In further preferred embodiments of the present invention, the device or the computer comprises a plurality of cores.

In further preferred embodiments of the present invention, the memory comprises a volatile memory (e.g., random access memory (RAM)) and/or a non-volatile memory (e.g., flash EEPROM).

In further preferred embodiments of the present invention, the computer comprises at least one of the following elements: microprocessor (UP), microcontroller (μC), application-specific integrated circuit (ASIC), system on chip (SoC), programmable logic module (e.g., FPGA, field programmable gate array), hardware circuitry, or any combinations thereof.

Further preferred embodiments of the present invention relate to a computer-readable storage medium comprising instructions that, when executed by a computer, cause the computer to execute the method according to the embodiments.

Further preferred embodiments of the present invention relate to a computer program comprising instructions that, when said computer program is executed by a computer, cause the computer to execute the method according to the embodiments.

Further preferred embodiments of the present invention relate to a data carrier signal characterizing and/or transmitting the computer program according to the embodiments. For example, the data carrier signal may be received over an optional data interface of the device.

Further preferred embodiments of the present invention relate to a reset ("reset") of at least one hardware component, in particular for at least one application.

Further preferred embodiments of the present invention perform a reset of modules of the device and/or any existing circuitry, in particular external circuitry, such that several independent applications can be executed and preferably do not affect each other.

In further preferred embodiments of the present invention, the device is developed to reset each core individually. Therefore, in particular, any additional cores present in the computer are not affected by the reset of a core.

In further preferred embodiments of the present invention, a plurality of regions or clusters may be provided that are for example characterized by at least one core and optionally memory assigned to the at least one core. In further preferred embodiments, the memory may be assigned logically and/or physically to the at least one core. In further preferred embodiments, at least one of the clusters may be reset independently of an operation of the further clusters, in particular without interfering with an operation of the further clusters. Thus, in further preferred embodiments, for example, at least one cluster may be reset, while optionally existing further clusters may continue to be operated independently of resetting the one cluster, for example to execute one or more applications.

In further preferred embodiments of the present invention, at least one cluster may also comprise at least one circuit component or circuit part, for example a phase-locked loop (PLL). In further preferred embodiments, the at least one circuit component may also be reset together with resetting the at least one cluster.

In further preferred embodiments of the present invention, any existing peripheral modules that can for example be assigned to the individual applications can be reset in a supervisor mode and/or at least one application.

In further preferred embodiments of the present invention, optionally existing external components, such as an external logic unit, may be reset over at least one separate data line, for example a separate GPIO (general purpose input output), wherein resetting is performed according to further preferred embodiments, for example, by a supervisor mode or by an application. In further preferred embodiments, the GPIO (signal) can for this purpose for example be routed as a reset signal to a reset input of the external component (for example, an external component or circuit).

In further preferred embodiments of the present invention, a plurality of reset terminals ("pins") may be provided for any existing external components or circuitry such that, for example, the external circuitry assigned to each application may be reset separately.

In further preferred embodiments of the present invention, resetting may be performed by at least one of the following sources, which are in particular independent of one another: a) a signal, in particular a hardware signal, e.g., triggered by a supervisor and/or monitoring logic unit, b) by a bit that performs the reset function when written to, c) when software, in particular an application, sets bits to correspond to the reset state.

In further preferred embodiments of the present invention, specific functions may still be specifically maintained in the aforementioned variant c). An example according to further preferred embodiments is a timer module ("timer"), which for example outputs a pulse width modulated (PWM) signal and is not to be interrupted, in particular also not by the reset. According to further preferred embodiments, the other instances or parameters of the timer can in this case by way of the register settings (writing or setting the bits) be brought into a state, for example, corresponding to the reset values ("reinitialization")—in particular in the same module, which according to further preferred embodiments could also be reset by hardware.

In further preferred embodiments of the present invention, using the circuit functions cited as examples above, it is possible according to further preferred embodiments to reset the components or circuit parts necessary for operating the application, in particular independently of the state and/or operation of the other applications (these may be in the reset, start-up, ramp-down or normal function state)—both by a supervisor and by at least one application itself.

Further preferred embodiments of the present invention relate to a method of resetting a device for controlling a technical system, in particular of a motor vehicle, for example of a control unit, wherein the resetting is performed while the device or the technical system is in operation (for example, in one of a plurality of possible operating states).

In further preferred embodiments of the present invention, multiple, in particular mutually independent or at least partially dependent applications are operated on the device simultaneously or at least chronologically overlapping.

In further preferred embodiments of the present invention, optionally provided further components or circuitry, in particular external components or circuitry, may be assigned to at least one application that is executed at least temporarily by the device or its computer or at least one core of the computer.

In further preferred embodiments of the present invention, the components may also be assigned to the at least one application dynamically, i.e., during a runtime of the device or the application.

In further preferred embodiments of the present invention, the optionally provided further components or circuitry may be reset in particular separately from a supervisor and/or at least one application, in particular without affecting a runtime behavior of at least one, preferably several, in particular all further applications of the device.

In further preferred embodiments of the present invention, the runtime behavior is characterized in that the same execution times are observed, in particular with respect to a bandwidth and/or with respect to latency boundary conditions, wherein the same clock-accurate behavior is not required in further preferred embodiments.

In further preferred embodiments of the present invention, further applications of the device are operated further while, or when, at least one other application of the device resets the modules and/or circuit parts assigned to the device.

Further preferred embodiments of the present invention relate to a behavior of memory regions of the memory, in particular of non-volatile memory regions ("NVM") of the memory, wherein in particular one or more of the non-volatile memory regions may each be assigned to an application or multiple applications.

Further preferred embodiments of the present invention provide that at least one NVM memory region can be assigned to at least one application.

In further preferred embodiments of the present invention, the NVM memory region is arranged such that the latter can be assigned to the at least one application for example via a) a MPU (memory protection unit), and/or b) via a supervisor, in particular via an assignment of a partition ID.

In further preferred embodiments of the present invention, the device or the computer comprises three cores ("cores"), for example, wherein an application is executed on each core, and wherein, for example, a specifiable memory region, for example 4 megabytes (MB), is assigned to each application.

In further preferred embodiments of the present invention, a plurality of memory modules is provided in the memory, in particular for the NVM memory regions, wherein preferably at least two, preferably more than two, further preferably all of the memory modules, are designed such that they are constructed or assembled either completely or from smaller sub-modules.

In further preferred embodiments of the present invention, the sub-modules have at least partially the same characteristics as a memory module to be assigned, e.g., with respect to common word line controls and/or common bit line read circuits and/or common programming voltage feeds.

In further preferred embodiments of the present invention, the device or computer is developed to reprogram the associated memory regions or modules or sub-modules independently of a state of other memory regions or modules or sub-modules, wherein in particular multiple instances of the resources necessary for this are for example available in each memory region. Therefore, in further preferred embodiments, it is possible for a first (memory) region to be reprogrammed, while the other (memory) regions continue to run the applications as if the one application or the memory region assigned to said application is not reprogrammed.

In further preferred embodiments of the present invention, the one application or the memory region assigned thereto may be reprogrammed from a supervisor and/or a partition manager and/or an application.

In further preferred embodiments of the present invention—in particular by providing the resources described above—the method can also be executed in an (in particular with regard to the computer or device) external memory, in particular NVM memory, which for example comprises a plurality of blocks and which can for example have a separate word line control for the blocks and/or separate bit line read circuits for the blocks. In further preferred embodiments, the NVM memory may be developed as a low power double data rate (LPDDR) memory type.

Further preferred embodiments of the present invention relate to a method for programming (and/or reprogramming) a device or a memory of, or for, the device, wherein the device is for example developed to control a technical system, such as of a motor vehicle, characterized by at least one of the following aspects:
  a) the method is performed, e.g., in a motor vehicle while in operation (e.g., in any of the various operating states of the motor vehicle),
  b) multiple independent or dependent applications are operated simultaneously or at least partially chronologically overlapping on, or by means of, the device or controller,
  c) different memory regions in and/or outside of the computer can be assigned to the applications, in particular flexibly and/or dynamically,
  d) different memory regions in and/or outside of the computer can be reprogrammed, in particular separately or independently of one another, by a supervisor and/or at least one (in particular an assigned) application, in particular without influencing the runtime behavior of at least one other application, or several, or all other applications of the device or computer (the runtime behavior is for example characterized in that the same execution times (in particular with regard to a specifiable bandwidth and/or specifiable latency boundary conditions are observed), wherein in particular the same clock-accurate behavior according to further preferred embodiments is not required),
  e) at least one other, preferably all other, applications of the device or the computer continue to be functional when one or more of the applications are reprogrammed.

Further preferred embodiments of the present invention relate to a fault collection and control unit, FCCU, i.e., to a device for collecting and managing faults, in particular to a partitioning of resources of the FCCU.

Further preferred embodiments of the present invention provide that the FCCU is developed to ensure independent (continued) operation of applications of the device or computer, which for example enables functionally deterministically separate responses (in particular responses related to functional safety), e.g., to hardware errors. In other words, in further preferred embodiments it is thereby made possible that applications not affected by the, e.g., hardware fault can continue to be executed.

In further preferred embodiments of the present invention, the FCCU is developed to collect hardware faults ("HW faults") in individual modules, such as a core, RAM (random access memory), NVM (non-volatile memory) and/or peripheral modules, and for example to perform fault responses that can be set or specified by a safety setup (device or configuration of aspects regarding functional safety), e.g., activation of one or more fault pins, triggering an interrupt (interrupt request), triggering a reset or activating an NMI (non-maskable interrupt request).

In further preferred embodiments of the present invention, fault input signals are assigned to one or more applications, wherein in particular fault responses (see for example the embodiments described as examples above) can also be generated or output to the partitions and/or applications and/or associated fault pins.

In further preferred embodiments of the present invention, the device or the computer comprises three cores, wherein, for example, an application is executed on each core at least temporarily, and wherein, for example, at least one specifiable memory region, e.g., 4 megabytes (MB), is temporarily assigned to each application.

For example, as soon as a fault is detected in a first of the three cores ("Core 1") on which a first application ("Application 1") runs, a lockstep fault in Core1 can be reported to the FCCU. In further preferred embodiments, the FCCU is configured such that the fault can preferably only affect the actions assigned to Application 1—e.g., the interrupt resources in the GIC ((generic) interrupt controller) of Core1, the reset of Core1, the NMI of Core1, or one/multiple fault pins. In further preferred embodiments, in a safety system setup it can be determined—e.g., by a supervisor or by Application 1—that this fault, e.g., triggers a reset of Core1 or that a reset of Core1 is to be triggered when this fault occurs. In further preferred embodiments, other applications (e.g., "Application 2" and "Application 3") are not influenced by the lockstep fault in Core 1 and preferably continue to run with the same temporal behavior.

According to further preferred embodiments of the present invention, for example, a fault can be detected in a third of the three cores ("Core 3") to which a third application ("Application 3") is assigned, e.g., a non-recoverable "double bit" fault in the NVM memory region assigned to application 3. Preferably, the FCCU is configured such that the fault is forwarded, in particular only, in response to the actions assigned to application 3. Further preferably, an interrupt request (interrupt) can be triggered, for example by the FCCU, to application 3, e.g., to call a fault handling routine for the double bit fault. In further preferred embodiments, the fault handling routine may for example include additional testing, e.g., to determine a severity of the safety impact of the fault, and optionally, accordingly, either to continue running application 3, or for example to reset it, or even to inform other applications, for example via the supervisor—e.g., by means of an interrupt—that they may (also) be impacted (by the fault) and that for example corresponding checks of the NVM memory assigned to Applications 1 and 2 are to be performed.

Further preferred embodiments of the present invention relate to a method of fault handling of an application in a device, e.g., a controller, for a technical system, e.g., for a motor vehicle, characterized by at least one of the following aspects:

a) the method is performed, e.g., in a motor vehicle while in operation (e.g., in any of the various operating states of the motor vehicle),
b) multiple independent or dependent applications are operated simultaneously or at least partially chronologically overlapping on, or by means of, the device or controller,
c) various faults or fault events (e.g., RAM, Core, NVM, . . . ) that may occur e.g. in and/or outside (external NVM or RAM) of the computer can each be assigned to at least one application,
d) at least one, preferably a plurality, in particular all, applications can, at least within their resources, evaluate a, or the, fault and/or initiate a corresponding fault response and/or at least inform another application, e.g., about possible safety errors, in particular in the resources assigned to them,
e) at least one, preferably several, in particular all, applications can be informed of a, or the, fault by at least one other application,
f) other applications, in particular applications not affected by a, or the, fault can continue to run, in particular continue to run such that the runtime behavior, in particular the latency boundary conditions, are observed, wherein in particular the same clock-accurate behavior is not required.

Further preferred embodiments of the present invention relate to a forwarding of information characterizing an operating state, in particular an operating state ("safety state") with respect to a functional safety ("safety"), of an application to at least one further unit, e.g., an external unit, in particular a unit arranged externally to the computer or device.

In further preferred embodiments of the present invention, it is provided, in particular in order to be able to ensure independent continued operation, with respect to functionally deterministically separated safety responses to hardware errors, of the unaffected application(s) and any external unit(s) optionally connected thereto (such as a control unit of drivers, e.g., PHY for signals that carry a safety load and that implement the connections of the computer ("computer pins"), e.g., on a physical bus protocol), or also the controls of components such as ignition/injection on an internal combustion engine), that these circuits, which are externally (with respect to the computer) assigned to the applications, e.g., signal the safety state "Error" (may also be "reset" in other preferred embodiments, but also in addition to the reset), in particular so as not to influence the circuit parts assigned to applications that are not impacted.

In further preferred embodiments of the present invention, three cores (3 cores) are provided by way of example, with 3 applications, wherein one of the three applications runs on each core. Three fault pins (connections, e.g., for signaling fault states) are also provided. In further preferred embodiments, external interfaces for a VCU (vehicle control unit) (e.g., Application 1 on Core1) and an injection for a combustion application (e.g., application 3 on Core3) are provided by way of example.

In further preferred embodiments of the present invention, the combustion application intends to switch off the injection, for example, to reduce the torque of the engine. For this purpose, for example, the fault pin 3 (e.g., which has been assigned to application 3 during startup (i.e., during startup of the device)) is activated, which is preferably connected to the (external) injection circuit (IC) such that it is switched off, in particular independently of the pulses that specify the injection timing, and for example does not control the injection valves. In further preferred embodiments, the VCU function continues to run simultaneously on Application 1 on Core 1—this VCU for example also transmits signals with a safety load over a CAN driver. In further preferred embodiments, the Error Pin1 (e.g., assigned to Application 1 during startup) is not activated, so that the CAN signals originating from the computer or the device are forwarded over the currently not deactivated CAN driver (to be deactivated with Error Pin1). As a result, the VCU application (continues) to run on Core1 unaffected by the fault of application 3, and in particular the aforementioned CAN signals continue to be transmitted.

Further preferred embodiments of the present invention relate to a method for signaling, in particular forwarding, the safety status of at least one application to units or components outside the computer or device, characterized by at least one of the following aspects:

a) the signaling of the safety status can preferably be used as the switch-off signal, e.g., for the external components ("peripheral modules"), b) the signaling can be assigned to individual applications for example running in parallel on the computer, wherein in particular peripheral modules assigned to an application can be reset independently of the state of other applications or their peripheral modules, c) an assignment can be made, preferably unchangeably, after a reset, d) aspects of these embodiments can also be utilized for external security components, such as external crypto components (cryptography accelerator, hardware security module), interfaces, e) use in aspects of functional safety ("FUSI,") as well as in aspects of security, e.g., against manipulations.

Other preferred embodiments of the present invention relate to a method of controlling a technical system, e.g., of a vehicle, wherein at least one peripheral module is assigned to at least one application. Preferably, the applications can each run in separate partitions on the computer.

In further preferred embodiments of the present invention, the at least one peripheral module is, for example, at least one of the following elements: timer, communication interfaces, GPIO ports (general input and/or output ports).

This preferably makes it possible to achieve the result that several applications do not influence one another while in operation on the computer.

Examples of an undesirable mutual influence that is avoidable according to further preferred embodiments of the present invention include:

1. Operation of an Analog-Digital Converter (ADC): When several applications access the resources of the ADC (e.g., channels/inputs and/or control registers), the one application can then for example overwrite the settings of another application—e.g., channel assignment, sample time (sampling rate), conversion time, . . .

2. CAN (Controller Area Network): When several applications use CAN identifiers on the same CAN bus, for example queue entries can be made in a CAN module, wherein the software of a partition (or e.g., an application) can overwrite the settings of another application.

Further preferred embodiments of the present invention provide that at least one peripheral module, can be, preferably completely, assigned to a partition or application.

In further preferred embodiments of the present invention, e.g., modules are provided for the device or computer, e.g., SPI (serial peripheral interface), LIN (local Interconnect Network), CAN, ADC, which can e.g., preferably be completely assigned to an application, in particular because the resources of these modules are either fully used by the partition or application, or these modules are present several times, in particular at such a high number that respective individual instances of these modules can be fully assigned to a partition or application.

Further preferred embodiments of the present invention provide the following mechanisms, in particular to separate these modules according to a target of a deterministic function:

assigning at least one, preferably several or all modules to a partition or application (in particular in the module), wherein the module in particular e.g., only accepts write and/or read commands from a bus (e.g., data bus for connecting the module to component(s) of the computer or device) that come with a specifiable identifier, e.g., "Partition ID," which was for example previously assigned to the module by a partition manager in the system setup.

In further preferred embodiments of the present invention, modules, preferably complete modules, are assigned in particular permanently (i.e., statically) to partitions, in particular to one partition or application.

Further preferred embodiments can provide that (peripheral) modules can be assigned to a plurality of applications, e.g., specifiable or controllable by at least one hardware function, such as an address range restriction.

In further preferred embodiments of the present invention, there are, e.g., modules in a device or computer, e.g., GTM (timer), Ethernet, HSM (hardware security module) (Windows), whose components or clusters or module parts can be assigned to partitions or to applications by an internal assignment of address ranges.

The following mechanism is provided to separate these modules according to further preferred embodiments of the present invention, in particular with the target of a deterministic function:

assigning the modules to the partitions or applications using address ranges, and/or arranging the resources in a module such that the resources assigned to a partition (or application) lie in an address range close to one another (e.g., adjacent), and/or the address range or the address ranges can e.g. be assigned externally via a bus bridge and/or via a memory protection unit (MPU), which e.g. ensures that the internal master/slave(s) not belonging to the assigned partition or application cannot read and/or write to this address range.

Further preferred embodiments of the present invention can thus assign (peripheral) modules to applications or partitions via a, preferably module-internal, restriction of the address ranges.

Further preferred embodiments of the present invention for example also have modules that can be separated from one another by software (SW) mechanisms, wherein these modules can for example be used by a plurality of partitions or applications. An example according to further preferred embodiments is for example Ethernet without using implemented queues; another example according to further preferred embodiments is a bus for inter-processor communication, or a CAN module, in which a SW assignment, in particular of the individual ID(s), is useful, for example because the system does not have a sufficient number of CAN modules.

Further preferred embodiments of the present invention therefore provide the following:
 a) configuring these modules, especially during startup, using a configuration tool such that the boundary conditions of all partitions or applications that utilize these resources are taken into account,
 b) example CAN/Ethernet: the bandwidth and/or latency from the requirement is implemented to meet the requirements-partition the Message ID to the queues of the modules with the corresponding priorities to be assigned,
 c) in ongoing operation, writing/reading to these resources is managed by the partition manager (SW, that runs in a rights mode above the partitions or applications)—there are preferably several options for calling the partition manager—e.g., via a call or via trap/emulate (writing specifically to a resource that is blocked, and thus the higher privilege level is called to resolve the access conflict,
 d) another option according to further preferred embodiments is to control the writing and/or reading in ongoing operation by setting up DMA channels—these DMA channels are then e.g., preferably only, activated on certain triggers, and the reading and/or writing then comprises e.g. only specific resources in the module, and e.g. then writing/reading the data from address ranges permanently assigned to the individual partitions.

Further preferred embodiments of the present invention therefore propose the following: assigning resources (e.g., peripheral modules) of the device or computer to a plurality of partitions or applications, wherein SW functions and HW functions are used.

Further preferred embodiments of the present invention relate to a method of controlling a technical system, e.g., of a vehicle, wherein a Quality of Service (QOS) or at least one parameter characterizing the quality of service is used to at least temporarily separate partitions or applications from one another.

According to further preferred embodiments of the present invention, it may be advantageous in devices or systems that can run multiple applications simultaneously to also take into account one or more buses that are in particular useful for data transfers between components—in particular to achieve identical runtimes of applications or a specifiable resource distribution (in particular independently of other applications).

Since the runtime of applications in further preferred embodiments of the present invention is influenced by multiple factors, these factors may also be addressed individually or in combination with one another in further preferred embodiments: —the core itself (mechanism hypervisor), —access to memory (QOS), —access to modules on the computer, such as SPI, Safety, . . . .

Further preferred embodiments of the present invention provide utilizing a mechanism for separating accesses to memories, as can, e.g., be provided for bus systems or bus architectures of the device or the computer, for separating accesses to the (peripheral) modules.

In further preferred embodiments of the present invention, at least one application, preferably multiple or all applications, set a quality of service ("Qos"), e.g., characterizable by latency and/or bandwidth, for at least one peripheral component or at least one peripheral module. For example:
 a) Application 1 sets 15 clock cycles of latency and 20% bus bandwidth for accesses to a peripheral component,
 b) Application 2 sets 40 clock cycles of latency and 70% bus bandwidth for the same peripheral component.

In other words, in further preferred embodiments of the present invention, the QoS or QOS mechanisms (e.g., implemented using hardware) can be used for controlling the bandwidth and/or latency of individual applications, in particular for separating peripheral accesses (accesses by applications to peripheral modules) and not to memories, wherein in particular use is also possible for deterministic separation of applications and a reduction of effort when implementing a plurality of applications in a device or computer, e.g., in a control unit.

Further preferred embodiments of the present invention provide using at least one counter to emulate a quality of service (Qos), which may be useful according to further preferred embodiments in particular when QoS cannot be implemented with hardware.

Further preferred embodiments of the present invention propose to emulate one or more QOS mechanisms, e.g., using at least one of the following elements: a) counters for latency and/or bandwidth are implemented, b) software evaluates these counters at a high priority level (e.g., above applications). A possible implementation according to further preferred embodiments for example provides: for each bus, x*2 registers (e.g., 32 bits wide) are implemented as counters, wherein x characterizes a number of the partitions to be supported, and the register or registers preferably count the accesses of the respectively assigned application for each clock cycle. Further preferably, the counter value is for example compared every z ms to an expected counter value, and if the counter value is greater than the expected counter value, the application and for example the partition manager are informed, in particular to initiate a substitute action.

In other preferred embodiments of the present invention—and depending on the type of device or controller, or depending on the type of target system for the device or controller—a time-synchronous grid or an angular-synchronous grid (e.g., with respect to a revolution of a crankshaft of a combustion engine) can be used, in particular for the above-described example of QOS emulation using counter(s).

In further preferred embodiments of the present invention, a counter is increased by a specifiable value, e.g., one, for each action applied on the bus with a (in particular specifiable) partition ID, whereby for example a measure characterizing a bandwidth can be determined.

In further preferred embodiments of the present invention, starting with a request on the bus of a (in particular specifiable) partition, the clock cycles are counted until the partition is granted the bus (access). It is o.k. if for example the number of counted clock cycles is less than a specifiable latency—if the value of the counted clock cycles is greater than the specifiable latency, this may be stored in further preferred embodiments and e.g. at the end of the set time interval, it can be read out whether the latency in the observed time interval was ever greater than the preset time, and optionally, if yes, by how much.

In further preferred embodiments of the present invention, it is alternatively or additionally possible, e.g., to perform a preset automatic comparison using hardware and/or to trigger an interrupt.

In further preferred embodiments of the present invention, one or more counters can be provided on at least one bus of the device or the computer.

In further preferred embodiments of the present invention, the counters may be used in conjunction with corresponding software (and/or hardware), e.g., to evaluate an observed allocated bandwidth and/or an (observed) latency.

Further preferred embodiments of the present invention relate to a method and device for controlling a technical system, e.g., of a vehicle, wherein a memory protection unit (MPU) is provided, wherein the memory protection unit is used in particular to restrict access rights to at least one bus system of the device or computer.

An advantage of operating a plurality of applications on a device or a computer according to further preferred embodiments is a short latency of a data exchange and a high bandwidth of the exchange; as a result, for example controllers can be computed in fewer time slots than those specified in conventional systems because the data from the other applications are available comparatively quickly.

In order to make this possible and in particular to ensure that several applications do not inadmissibly interfere with each other, further preferred embodiments propose to use an MPU within the computer or outside the computer, e.g., in the area of the bus system, to restrict access rights.

Further preferred embodiments of the present invention can, for example, make use of the following procedure: For example, a core-external MPU is provided, e.g., in a bus interface, wherein two applications are provided, each of which runs on a core.

In further preferred embodiments of the present invention, the MPU can be configured, e.g., on system startup, such that regions for writing are assigned in the local memory respectively assigned to the other core, and that regions for reading are authorized in the first memory. It is then possible, for example, for each application to read the data of the other core and locally provide data to the latter by writing, in particular without it being possible to overwrite other (memory) areas.

Accordingly, further preferred embodiments of the present invention provide as follows: a method for using a memory region assignment by means of an MPU to secure a deterministic data exchange between a plurality of applications running on the computer or the device.

Accordingly, further preferred embodiments of the present invention provide as follows: a method for securing deterministic memory accesses and/or data exchanges of different applications using at least one MPU. Particularly preferably, "deterministic" in this context refers to the application timing (i.e., the temporal behavior of the application(s)), and in particular not to a specific number of cycles for accessing the respective resources.

Further preferred embodiments of the present invention relate to a method and apparatus for controlling a technical system, e.g., of a vehicle, wherein at least one hardware accelerator unit is used to accelerate a startup of the system.

In modern (in particular automotive) systems, it happens that existing software of a device is replaced with other SW ("tuning"), in order, e.g., to make more power available in the application (for example, more power, HP). A method of detecting and potentially preventing this proposes that during system boot (starting or start-up), the software code is first checked to determine whether it is the code that is to be actually executed or whether the code has been manipulated, for example in the context of a tuning action.

A method according to further preferred embodiments for checking the SW code provides that at least one checksum is determined or calculated for a specifiable memory region or the (in particular entire) memory. One problem with this can be that determining or calculating the checksum takes comparatively long, therefore extending the boot operation. In further preferred embodiments, a boot operation should be completed in e.g., 30 ms-100 ms. However, the checksum calculation may add a significant number of milliseconds.

Further preferred embodiments therefore propose to provide at least one hardware accelerator unit and to use the latter to calculate the checksum(s) ("HW checksum accelerator"). Further preferred embodiments may also provide a plurality of hardware accelerator units, which may each process a part of the memory to be tested or form a checksum for the respective part. Further preferably, the checksum is calculated by means of the at least one hardware accelerator unit prior to a start of the application(s).

In further preferred embodiments, hardware accelerator units may also be assigned to different partitions or applications.

Further preferred embodiments relate to a method and device for controlling a technical system, e.g., a vehicle, wherein a mechanism, preferably in the interface of the module, is implemented in at least one hardware module or a peripheral component, the mechanism placing orders of a plurality of partitions or applications, which in particular cannot be overwritten or influenced by other partitions. Further preferred embodiments may also refer to the mechanism as "transfer window(s)."

In further preferred embodiments of the present invention, the HW module (or a controller of the module, e.g., a microcontroller of the module) or the peripheral component is developed to process these orders according to a specified rule, e.g., in a round robin method, whereby advantageously a deterministic temporal behavior is produced for the (external) applications.

Further preferred embodiments of the present invention provide for an implementation of Transfer Windows in at least one HW module having at least one of the following aspects:
   a) The address range of the Transfer Window can optionally be assigned to different applications/partitions,
   b) The module processes the tasks, e.g., by means of SW, according to a specifiable method, e.g., a round robin method.

Other preferred embodiments of the present invention relate to a device for carrying out the method according to at least one of the above embodiments, wherein in particular the device is developed for controlling a technical system, in particular of a motor vehicle.

Further preferred embodiments of the present invention provide that the device comprises: a computer comprising at least one core, preferably a plurality of cores, a memory assigned to the computer for at least temporarily storing at least one of the following elements: a) data, b) computer program, in particular for carrying out the method according to the embodiments.

In further preferred embodiments of the present invention, the memory comprises a volatile memory (e.g., random access memory (RAM)) and/or a non-volatile (NVM) memory (e.g., flash EEPROM), or a combination thereof, or with other, not explicitly mentioned types of memory.

In further preferred embodiments of the present invention, the device comprises at least one analog/digital (A/D) converter developed to transform a received analog (time and/or value-continuous) signal into a time and/or value-discrete signal, and/or at least one further or other peripheral component such as a timer and/or a data interface.

Further preferred embodiments of the present invention relate to a computer-readable storage medium comprising instructions that, when executed by a computer, cause the computer to execute the method according to the embodiments.

Further preferred embodiments of the present invention relate to a computer program comprising instructions that, when said computer program is executed by a computer, cause the computer to execute the method according to the embodiments.

Further preferred embodiments of the present invention relate to a data carrier signal characterizing and/or transmitting the computer program according to the embodiments. The data carrier signal can be received, for example, via one, or the, optional data interface of the device.

Further preferred embodiments of the present invention relate to a use of the method according to the embodiments and/or the device according to the embodiments and/or the computer-readable storage medium according to the embodiments and/or the computer program according to the embodiments and/or the data carrier signal according to the embodiments of the present invention for at least one of the following elements: a) enabling deterministic runtime behavior of at least some, preferably all, applications of the device, b) avoiding a new homologation for a first application, in particular when changing at least one further application.

Further features, possible applications and advantages of the present invention are shown in the following description of exemplary embodiments of the present invention, which are shown in the figures. All described or depicted features by themselves or in any combination constitute the subject matter of the invention, regardless of their formulation or representation in the description or in the figures.

BRIEF DESCRIPTION OF THE DRAWINGS

FIG. 3A shows a schematical illustration of a simplified flow chart with respect to method aspects according to further preferred embodiments of the present invention.

FIGS. 3B, 3C, 3D, 3E, 3F, 3G, 3H, 3I show schematical illustrations, each of a simplified flow chart with respect to method aspects according to further preferred embodiments of the present invention.

DETAILED DESCRIPTION OF EXAMPLE EMBODIMENTS

Figure 1:
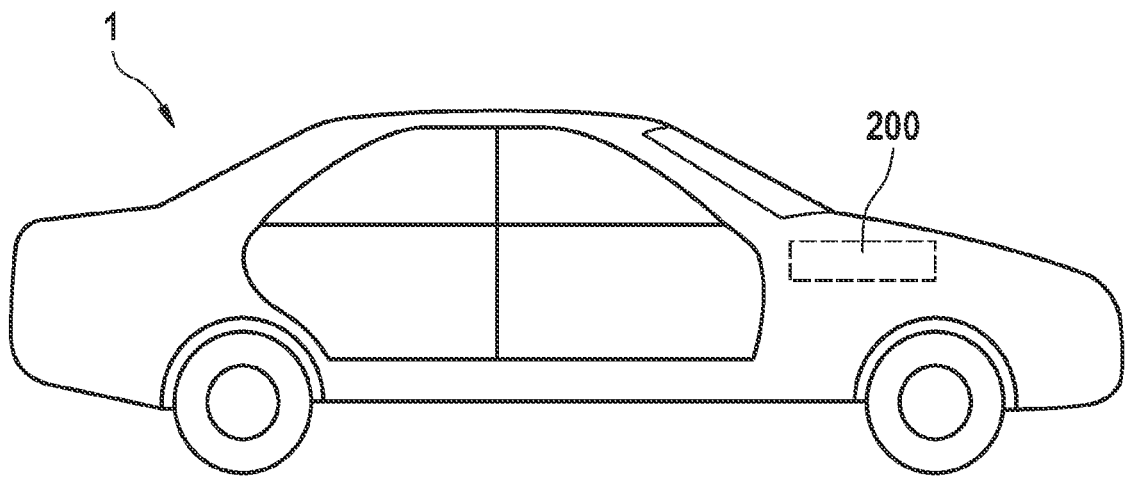
FIG. 1 shows a schematical illustration of a simplified block diagram of a technical system according to preferred embodiments of the present invention.

Preferred embodiments relate to methods and/or a device 200 for controlling a technical system 1, e.g., of a vehicle 1, in particular of a motor vehicle, cf. FIG. 1.

Figure 2:
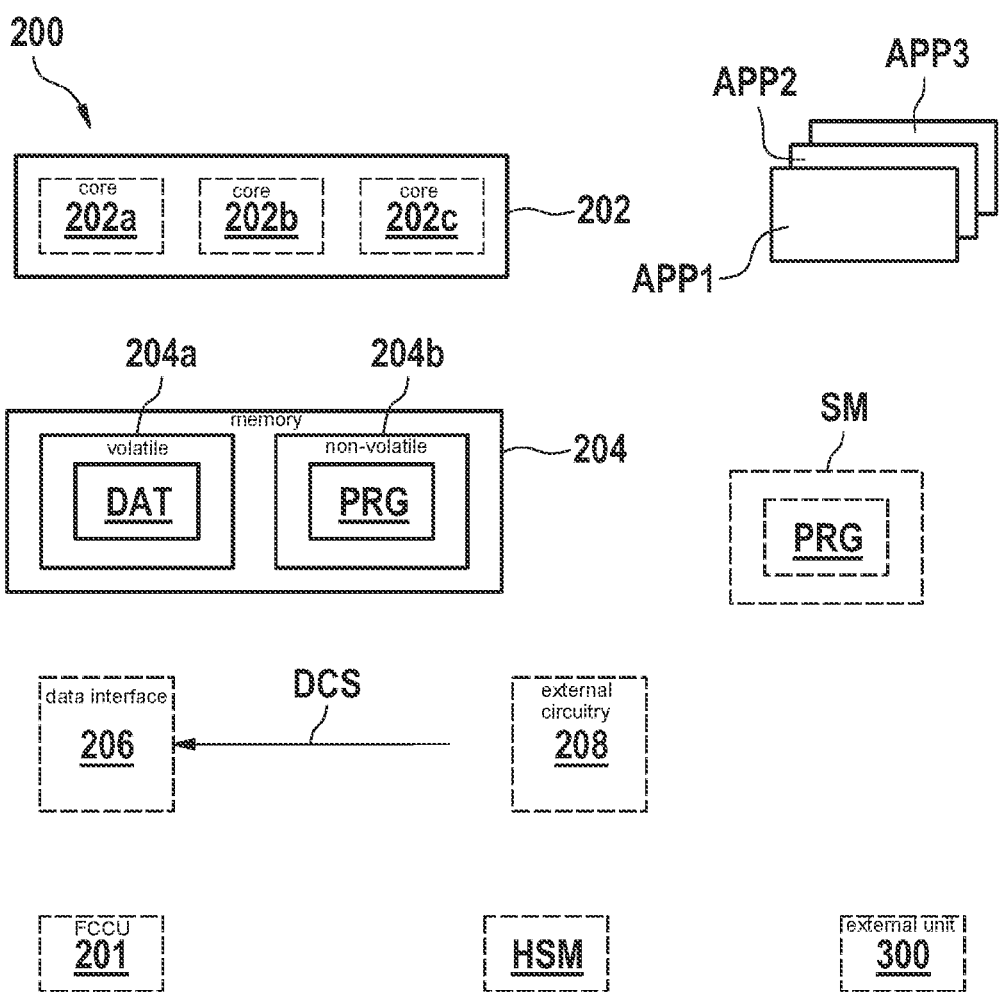
FIG. 2 shows a schematical illustration of a simplified block diagram of an apparatus according to further preferred embodiments of the present invention.

Further preferred embodiments, cf. FIG. 2, provide that the device 200 comprises: a computer 202 comprising at least one (e.g., three in the present case) core(s), 202a, 202b, 202c, a memory 204 assigned to the computer 202 for at least temporarily storing at least one of the following elements: a) data DAT, b) computer program PRG, in particular for executing a method according to the embodiments. In further preferred embodiments, the computer program PRG may also characterize at least one application APP1, APP2, APP3 that is executed at least temporarily on the computer 202, e.g., for controlling the technical system 1 or components thereof (e.g., brake system, combustion engine).

In further preferred embodiments, the device 200 or the computer 202 comprises a plurality of cores 202a, 202b, 202c. More than the three cores 202a, 202b, 202c illustrated by way of example in FIG. 1 are also possible in further preferred embodiments.

In further preferred embodiments, the memory 204 comprises a volatile memory 204a (e.g., random access memory (RAM)) and/or a non-volatile (NVM) memory 204b (e.g., flash EEPROM).

In further preferred embodiments, the computer 202 comprises at least one of the following elements or is developed as at least one of these elements: microprocessor (µP), microcontroller (µC), application-specific integrated circuit (ASIC), system on chip (SoC), programmable logic module (e.g., FPGA, field programmable gate array), hardware circuitry, or any combinations thereof.

Further preferred embodiments relate to a computer-readable storage medium SM comprising instructions PRG that, when executed by a computer, cause the computer 202 to execute the method according to the embodiments.

Further preferred embodiments relate to a computer program PRG comprising instructions that, when said program is executed by a computer 202, cause the computer 202 to execute the method according to the embodiments.

Further preferred embodiments relate to a data carrier signal DCS characterizing and/or transmitting the computer program according to the embodiments. The data carrier signal DCS can be received, for example, via an optional data interface 206 of the device 200.

Further preferred embodiments, cf. FIG. 3A, relate to a reset 100, 102 of at least one hardware component, in particular for at least one application APP1.

In further preferred embodiments, a reset 100, 102 of modules of the device 200 and/or any existing, in particular external, circuitry 208 (e.g., analog/digital converters, ADC) is developed such that several independent applications APP1, APP2, APP3 can be operated and preferably do not influence one another.

In further preferred embodiments, the device 200 is developed to reset each core 202a, 202b, 202c individually. In particular, any additional cores 202b, 202c present in the computer 202 are as a result not affected by the reset of a core 202a.

In further preferred embodiments, a plurality of regions or clusters may be provided that are characterized by, for example, at least one core 202a and optionally memory 204a assigned to the at least one core. In further preferred embodiments, the memory may be assigned logically and/or physically to the at least one core. In further preferred embodiments, at least one of the clusters may be reset independently of an operation of the further clusters, in particular without interfering with an operation of the further clusters. Thus, in further preferred embodiments, for example, at least one cluster may be reset, while optionally existing further clusters may continue to be operated independently of resetting the one cluster, for example to execute one or more applications.

In further preferred embodiments, at least one cluster may also comprise at least one circuit component or circuit part, for example a phase-locked loop (PLL). In further preferred embodiments, the at least one circuit component may also be reset together with resetting the at least one cluster.

In further preferred embodiments, any existing peripheral modules that can for example be assigned to the individual applications APP1, APP2, APP3 can be reset in a supervisor mode and/or at least one application.

In further preferred embodiments, optionally existing external components, such as external logic units, can be reset via at least one dedicated data line, for example a dedicated GPIO (general purpose input output), wherein resetting is performed according to further preferred embodiments, for example, by a supervisor mode or by an application APP1, APP2, APP3. In further preferred embodiments, the GPIO (signal) can for this purpose for example be routed as a reset signal to a reset input of the external component (for example, an external component or circuit).

In further preferred embodiments, a plurality of reset terminals ("pins") may be provided for any existing external components or circuitry such that, for example, the external circuitry assigned to each application may be reset separately.

In further preferred embodiments, resetting may be performed by at least one of the following sources, which are in particular independent of one another: a) a signal, in particular a hardware signal, e.g., triggered by a supervisor and/or monitoring logic unit, b) by a bit that performs the reset function when written to, c) by software, in particular an application that sets bits to correspond to the reset state.

In further preferred embodiments, specific functions may still be specifically maintained in the aforementioned variant c). An optional timer, which for example outputs a pulse width modulated (PWM) signal, and which is not to be interrupted, in particular also not by the reset, is mentioned as an example according to further preferred embodiments. According to further preferred embodiments, the other instances or parameters of the timer can in this case by way of the register settings (writing or setting the bits) be brought into a state, for example, corresponding to the reset values ("reinitialization")—in particular in the same module, which according to further preferred embodiments could also be reset by hardware.

In further preferred embodiments, using the circuit functions cited as examples above, it is possible according to further preferred embodiments to reset the components or circuit parts necessary for operating the application, in particular independently of the state and/or operation of the other applications APP2, APP3 (these may be in the reset, start-up, ramp-down or normal function state)—both by a supervisor and by at least one application APP1 itself.

Further preferred embodiments relate to a method of resetting a device 200 for controlling a technical system 1, in particular of a motor vehicle, for example a control unit, wherein the resetting is performed while the device 200 or the technical system 1 is in operation (for example, in one of a plurality of possible operating states).

In further preferred embodiments, multiple applications APP1, APP2, APP3, which are in particular mutually independent or at least partially dependent, are operated on the device 200 simultaneously or at least chronologically overlapping.

In further preferred embodiments, optionally provided further components 208 or circuitry, in particular external components or circuitry, may be assigned to at least one application APP1 that is executed at least temporarily by the device 200 or its computer 202 or at least one core 202a of the computer 202.

In further preferred embodiments, the components may also be assigned to the at least one application dynamically, i.e., during a runtime of the device or the application.

In further preferred embodiments, the optionally provided further components or circuitry may be reset in particular separately by a supervisor and/or at least one application, in particular without influencing a runtime behavior of at least one, preferably several, in particular all further applications of the device.

In further preferred embodiments, the runtime behavior is characterized in that the same execution times are observed, in particular with respect to a bandwidth and/or with respect to latency boundary conditions, wherein the same clock-accurate behavior is not required in further preferred embodiments.

In further preferred embodiments, further applications APP3 of the device 200 are operated further while, or when, at least one other application APP2 of the device 200 resets the modules 208 and/or circuit parts assigned to the device 200.

Further preferred embodiments, cf. FIG. 3B, relate to a behavior of memory regions of the memory, in particular of non-volatile memory regions ("NVM") of the memory, wherein in particular one or more of the non-volatile memory regions SB1 may each be assigned to an application APP1 or are, or may be, assigned 110 to multiple applications.

Further preferred embodiments provide that at least one NVM memory region SB1 can be assigned to one, in particular to exactly one, application APP1.

In further preferred embodiments, the NVM memory region is arranged such that the latter can be assigned to at least one application for example via a) a MPU (memory protection unit), and/or b) via a supervisor, in particular via an assignment of a partition ID.

In further preferred embodiments, the device 200 or the computer 202 comprises three cores 202a, 202b, 202c, wherein for example an application is executed on each core, and wherein for example a specifiable memory region, e.g., 4 megabytes (MB), is assigned to each application. For example, a first memory region SB1 is assigned to a first application APP1 and a second memory region SB2 is assigned to a second application APP1, cf. steps 110, 112 according to FIG. 3B.

In further preferred embodiments, a plurality of memory modules is provided in the memory 204, in particular for the NVM memory regions 204b, wherein preferably at least two, preferably more than two, further preferably all of the memory modules are designed such that they are constructed or assembled either completely or from smaller sub-modules.

In further preferred embodiments, the sub-modules have at least partially the same characteristics as a memory module to be assigned, e.g., with respect to common word line controls and/or common bit line read circuits and/or common programming voltage feeds.

In further preferred embodiments, the device 200 or computer 202 is developed to reprogram the associated memory regions or modules or sub-modules independently of a state of other memory regions or modules or sub-modules, wherein in particular multiple instances of the resources necessary for this are for example available in each memory region. Therefore, in further preferred embodiments, it is possible for a first (memory) region to be reprogrammed, while the other (memory) regions continue to run the applications as if the one application or the memory region assigned to said application is not reprogrammed.

In further preferred embodiments, the one application or the memory region assigned thereto may be reprogrammed from a supervisor and/or a partition manager and/or an application.

In further preferred embodiments—in particular by providing the resources described above—the method can also be executed in an (in particular with regard to the computer or device) external memory, in particular NVM memory, which for example comprises a plurality of blocks and which can for example have a separate word line control for the blocks and/or separate bit line read circuits for the blocks. In further preferred embodiments, the NVM memory may be developed as a low power double data rate (LPDDR) memory type.

Further preferred embodiments relate to a method for programming (and/or reprogramming) a device or a memory of, or for, the device, wherein the device is for example developed to control a technical system, such as of a motor vehicle, characterized by at least one of the following aspects:
- a) the method is performed, e.g., in a motor vehicle while in operation (e.g., in one of the various operating states of the motor vehicle),
- b) multiple independent or dependent applications are operated simultaneously or at least partially chronologically overlapping on, or by means of, the device or controller,
- c) different memory regions in and/or outside of the computer can be assigned to the applications, in particular flexibly and/or dynamically,
- d) different memory regions in and/or outside of the computer can be reprogrammed, in particular separately or independently of one another, by a supervisor and/or at least one (in particular an assigned) application, in particular without influencing the runtime behavior of at least one other application, or several, or all other applications of the device or computer (the runtime behavior is for example characterized in that the same execution times (in particular with regard to a specifiable bandwidth and/or specifiable latency boundary conditions are observed), wherein in particular the same clock-accurate behavior according to further preferred embodiments is not required),
- e) at least one other, preferably all other, applications of the device or the computer continue to be functional when one or more of the applications are reprogrammed.

Further preferred embodiments, cf. FIG. 3C, relate to a fault collection and control unit, FCCU, 201 (FIG. 2), i.e., to a device for collecting and managing faults, in particular to a partitioning of resources of the FCCU. Step 115 of FIG. 3C symbolizes the use of the FCCU 201.

Further preferred embodiments provide that the FCCU is developed to ensure independent (continued) operation of applications of the device or computer, which for example enables functionally deterministically separate responses (in particular responses related to functional safety), e.g., to hardware errors. In other words, in further preferred embodiments it is thereby made possible that applications not affected by the, e.g., hardware fault can continue to be executed.

In further preferred embodiments, the FCCU is developed to collect 116 (FIG. 3C) hardware failures ("HW failures") in individual modules, such as a core, RAM (random access memory), NVM (non-volatile memory) and/or peripheral modules, and to for example perform 117 fault responses that can be implemented by a safety setup (device or configuration of aspects regarding functional safety), e.g., activation of one or more fault pins, triggering an interrupt (interrupt request), triggering a reset or activating an NMI (non-maskable interrupt request).

In further preferred embodiments, fault input signals are assigned to one or more applications, wherein in particular fault responses (see for example the embodiments described as examples above) can also be generated or output to the partitions and/or applications and/or associated fault pins.

For example, once a fault is detected in a first core ("Core 1") 202a (FIG. 2) of the three cores on which, for example, a first application APP1 ("Application 1") runs, a lockstep fault in Corel 202a can e.g. be reported to FCCU 201. In further preferred embodiments, the FCCU 201 is configured such that the fault can preferably only affect the actions assigned to Application 1—e.g., the interrupt resources in the GIC ((generic) interrupt controller) of Corel 202a, the reset of Corel, the NMI of Corel, or one/several fault pin(s). In further preferred embodiments, it can be determined in a safety system setup—e.g., by a supervisor or Application 1—that this fault e.g., triggers a reset of Corel or that a reset of Corel is triggered when this fault occurs. In further preferred embodiments, other applications (e.g., "Application 2" and "Application 3") are not influenced by the lockstep fault in core 1 and preferably continue to run with the same temporal behavior.

According to further preferred embodiments, for example, in a third Core 202c ("Core 3") of the three cores to which a third application APP3 ("Application 3") is assigned, a fault may be detected, e.g., a non-recoverable "double bit" fault in the NVM memory region assigned to application 3. Preferably, FCCU 201 is configured such that the fault is forwarded, in particular only in response to the actions assigned to application 3. Further preferably, an interrupt request can be triggered, for example by the FCCU, to application 3, e.g., to call a fault handling routine for the double bit fault. In further preferred embodiments, the fault handling routine may for example include additional testing, e.g., to determine a severity of the safety impact of the fault, and optionally, accordingly, either to continue running application 3, or for example to reset it, or also to inform other applications, for example via the supervisor—e.g., by means of an interrupt—that they may (also) be impacted (by the fault) and that for example corresponding checks of the NVM memory assigned to Applications 1 and 2 are to be performed.

Further preferred embodiments of the present invention relate to a method of fault handling of an application in a device, e.g., a controller, for a technical system, e.g., for a motor vehicle, characterized by at least one of the following aspects:
- a) the method is performed, e.g., in a motor vehicle while in operation (e.g., in any of the various operating states of the motor vehicle),
- b) multiple independent or dependent applications are operated simultaneously or at least partially chronologically overlapping on, or by means of, the device or controller,
- c) various faults or fault events (e.g., RAM, Core, NVM, . . . ) that may occur e.g. in and/or outside (external NVM or RAM) of the computer can each be assigned to at least one application,
- d) at least one, preferably a plurality, in particular all, applications can, at least within their resources, evaluate a, or the, fault and/or initiate a corresponding fault response and/or at least inform another application, e.g., about possible safety errors, in particular in the resources assigned to them,
- e) at least one, preferably several, in particular all, applications can be informed of a, or the, fault by at least one other application,
- f) other applications, in particular applications not affected by a, or the, fault can continue to run, in particular continue to run such that the runtime behavior, in particular the latency boundary conditions, are observed, wherein in particular the same clock-accurate behavior is not required.

Further preferred embodiments, cf. FIG. 3D, relate to a forwarding 120 of information I1-FUSI characterizing an operating state, in particular an operating state ("safety state") with respect to a functional safety of an application APP1, APP2, APP3, to at least one further unit, e.g., an external unit 300 (FIG. 2), in particular to a unit 300 arranged externally to the computer 202 or device 200.

In further preferred embodiments, it is provided, in particular in order to be able to ensure independent continued operation, with respect to functionally deterministically separated safety responses to hardware errors, of the unaffected application(s) and any external unit(s) optionally connected thereto (such as a control unit of drivers, e.g., PHY for signals that carry a safety load and that implement the connections of the computer ("computer pins"), e.g., on a physical bus protocol), or also the controls of components such as ignition/injection on an internal combustion engine), that these circuits, which are externally (with respect to the computer) assigned to the applications, e.g., signal the safety state "Error" (may also be "reset" in other preferred embodiments, but also in addition to the reset), in particular so as not to influence the circuit parts assigned to applications that are not impacted.

In further preferred embodiments, three cores are provided by way of example, with 3 applications, wherein one of the three applications runs on each core. Three fault pins (connections, e.g., for signaling fault states) are also provided. In further preferred embodiments, external interfaces for a VCU (vehicle control unit) (e.g., Application 1 on Core1) and an injection for a combustion application (e.g., Application 3 on Core3) are provided by way of example.

In further preferred embodiments, the combustion application intends to switch off the injection, for example, to reduce the torque of the engine. For this purpose, for example, the fault pin 3 (e.g., which has been assigned to application 3 during startup (i.e., during startup of the device)) is activated, which is preferably connected to the (external) injection circuit (IC) such that it is switched off, in particular independently of the pulses that specify the injection timing, and for example does not control the injection valves. In further preferred embodiments, the VCU function continues to run simultaneously on Application 1 on Core 1—this VCU for example also transmits signals with a safety load over a CAN driver. In further preferred embodiments, the Error Pin1 (e.g., assigned to Application 1 during startup) is not activated, so that the CAN signals originating from the computer or the device are forwarded over the currently not deactivated CAN driver (to be deactivated with Error Pin1). As a result, the VCU application (continues) to run on Core1 unaffected by the fault of application 3, and in particular the aforementioned CAN signals continue to be transmitted.

Further preferred embodiments relate to a method for signaling, in particular forwarding, the safety status of at least one application to units or components outside the computer or device, characterized by at least one of the following aspects:

a) the signaling of the safety status can preferably be used as the switch-off signal, e.g., for the external components ("peripheral modules"), b) the signaling can be assigned to individual applications for example running in parallel on the computer, wherein in particular peripheral modules assigned to an application can be reset independently of the state of other applications or their peripheral modules, c) an assignment can be made, preferably unchangeably, after a reset, d) aspects of these embodiments can also be utilized for external security components, such as external crypto components (cryptography accelerator, hardware security module), interfaces, e) use in aspects of functional safety ("FUSI,") as well as in aspects of security, e.g., against manipulation.

Further preferred embodiments, cf. FIG. 3E, relate to a method for controlling a technical system 1, e.g., a vehicle 1, wherein at least one peripheral module 206 is assigned to at least one, in particular precisely one, application APP1, cf. Step 125 of FIG. 3E. Preferably, the applications may each run in separate partitions on the computer 202.

In further preferred embodiments, the at least one peripheral module 206 is, for example, at least one of the following elements: A timer, communication interfaces 206, GPIO ports (general input and/or output ports).

This preferably makes it possible to achieve the result that several applications APP1, APP2, APP3 do not influence one another while in operation on the computer 202.

Examples of an undesirable mutual influence that is avoidable according to further preferred embodiments include:

1. Operation of an Analog-Digital Converter (ADC): when several applications access the resources of the ADC (e.g., channels/inputs and/or control registers), the one application can then for example overwrite the settings of another application—e.g., channel assignment, sample time (sampling rate), conversion time, . . .

2. CAN (Controller Area Network): when several applications use CAN identifiers on the same CAN bus, for example queue entries can be made in a CAN module, wherein the software of a partition (or e.g., an application) can overwrite the settings of another application.

Further preferred embodiments provide that at least one peripheral module, can be, preferably completely, assigned to a partition or application.

In further preferred embodiments, e.g., modules are provided for the device or computer, e.g., SPI (serial peripheral interface), LIN (local Interconnect Network), CAN, ADC, which can e.g., preferably be completely assigned to an application, in particular because the resources of these modules are either fully used by the partition or application, or these modules are present several times, in particular at such a high number that respective individual instances of these modules can be fully assigned to a partition or application.

Further preferred embodiments propose the following mechanisms, in particular to separate these modules according to a target of a deterministic function:

assigning at least one, preferably several or all modules to a partition or application (in particular in the module), wherein the module in particular e.g., only accepts write and/or read commands from a bus (e.g., data bus for connecting the module to component(s) of the computer or device) that come with a specifiable identifier, e.g., "Partition ID," which was for example previously assigned to the module by a partition manager in system setup.

In further preferred embodiments, modules, preferably complete modules, are assigned in particular permanently (i.e., statically) to partitions, in particular to one partition or application.

Further preferred embodiments can provide that (peripheral) modules can be assigned to a plurality of applications, e.g., specifiable or controllable by at least one hardware function, such as an address range restriction.

In further preferred embodiments, there are e.g., modules in a device or computer, e.g., GTM (timer), Ethernet, HSM (hardware security module) (Windows), whose components or clusters or module parts can be assigned to partitions or to applications by an internal assignment of address ranges.

The following mechanism is proposed to separate these modules according to further preferred embodiments, in particular with the target of a deterministic function:

assigning the modules to the partitions or applications using address ranges, and/or arranging the resources in a module such that the resources assigned to a partition (or application) lie in an address range close to one another (e.g., adjacent), and/or the address range or the address ranges can e.g., be assigned externally via a bus bridge and/or via a memory protection unit (MPU), which e.g. ensures that the internal master/slave(s) not belonging to the assigned partition or application cannot read and/or write to this address range.

Further preferred embodiments can thus assign (peripheral) modules to applications or partitions via a, preferably module-internal, restriction of the address ranges.

Further preferred embodiments for example also have modules that can be separated from one another by software (SW) mechanisms, wherein these modules can for example be used by a plurality of partitions or applications. An example according to further preferred embodiments is for example Ethernet without using implemented queues; another example according to further preferred embodiments is a bus for inter-processor communication, or a CAN module, in which a SW assignment, in particular of the individual ID(s), is useful, for example because the system does not have a sufficient number of CAN modules.

Further preferred embodiments therefore propose the following:

a) configuring these modules, especially during startup, using a configuration tool such that the boundary conditions of all partitions or applications that utilize these resources are taken into account, b) example CAN/Ethernet: the bandwidth and/or latency from the requirement is implemented to meet the requirements-partition the Message ID to the queues of the modules with the corresponding priorities to be assigned, c) in ongoing operation, writing/reading to these resources is managed by the partition panager (SW that runs in a rights mode above the partitions or applications)—there are preferably several options for calling the partition manager—e.g., via a call or via trap/emulate (writing specifically to a resource that is blocked, and thus as a result the higher privilege level is called to resolve the access conflict, d) another option according to further preferred embodiments is to control the writing and/or reading in ongoing operation by setting up DMA channels—these DMA channels are then e.g., preferably only, activated on certain triggers, and the reading and/or writing then comprises e.g. only specific resources in the module, and e.g. then writing/reading the data from address ranges permanently assigned to the individual partitions.

Further preferred embodiments therefore propose the following: assigning resources (e.g. peripheral modules) of the device or computer to a plurality of partitions or applications, wherein SW functions and HW functions are used.

Further preferred embodiments, cf. FIG. 3F, relate to a method of controlling a technical system, e.g., of a vehicle, wherein a Quality of Service (QOS) or at least one parameter characterizing the quality of service is used, cf. Step 130, to at least temporarily separate the partitions or applications from one another.

According to further preferred embodiments, it may be advantageous in devices or systems that can run multiple applications simultaneously to also take into account one or more buses that are in particular useful for data transfers between components—in particular to achieve identical runtimes of applications or a specifiable resource distribution (in particular independently of other applications).

Since the runtime of applications in further preferred embodiments is influenced by multiple factors, these factors may also be addressed individually or in combination with one another in further preferred embodiments: —the core itself (mechanism hypervisor), —access to memory (QoS), —access to modules on the computer, such as SPI, Safety, . . . .

Further preferred embodiments propose to utilize a mechanism for separating accesses to memories, as can e.g. be provided for bus systems or bus architectures of the device or the computer, for separating accesses to the (peripheral) modules.

In further preferred embodiments, at least one application, preferably multiple or all applications, set a quality of service ("QoS"), e.g., characterizable by latency and/or bandwidth, for at least one peripheral component or at least one peripheral module, cf. the optional Step 132 according to FIG. 3F. For example:

a) Application 1 sets 15 clock cycles of latency and 20% bus bandwidth for accesses to a peripheral component, b) Application 2 sets 40 clock cycles of latency and 70% bus bandwidth for the same peripheral component.

In other words, in further preferred embodiments, the QoS or QoS mechanisms can be used (e.g., implemented using hardware) for controlling the bandwidth and/or latency of individual applications APP1, in particular for separating peripheral accesses (accesses by applications to peripheral modules) and not to memories, wherein in particular use is also possible for deterministic separation of applications and a reduction of effort when implementing a plurality of applications in a device or computer, e.g., in a control unit.

Further preferred embodiments propose to use at least one counter to emulate a quality of service (QOS), which may be useful according to further preferred embodiments in particular when QoS cannot be implemented with hardware.

Further preferred embodiments propose to emulate one or more QoS mechanisms, e.g., using at least one of the following elements: a) counters for latency and/or bandwidth are implemented, b) software evaluates these counters at a high priority level (e.g., above applications). A possible implementation according to further preferred embodiments for example provides: for each bus, x*2 registers (e.g., 32 bits wide) are implemented as counters, wherein x characterizes a number of the partitions to be supported, and the register or registers preferably count the accesses of the respectively assigned application for each clock cycle. Further preferably, the counter value is for example compared every z ms to an expected counter value, and if the counter value is greater than the expected counter value, the application and for example the partition manager are informed, in particular to initiate a substitute action.

In other preferred embodiments—and depending on the type of device 200 or controller, or depending on the type of target system 1 for the device or controller—a time-synchronous grid or an angular-synchronous grid (e.g., with respect to a revolution of a crankshaft of a combustion engine) can be used, in particular for the above-described example of QOS emulation using counter(s).

In further preferred embodiments, a counter is increased by a specifiable value, e.g., one, for each action applied on the bus with a (in particular specifiable) partition ID, whereby for example a measure characterizing a bandwidth can be determined.

In further preferred embodiments, starting with a request on the bus of a (in particular specifiable) partition, the clock cycles are counted until the partition is granted the bus (access). It is o.k. if for example the number of counted clock cycles is less than a specifiable latency—if the value of the counted clock cycles is greater than the specifiable latency, this may be stored in further preferred embodiments and e.g. at the end of the set time interval, it can be read out whether the latency in the observed time interval was ever greater than the preset time, and optionally, if yes, by how much.

In further preferred embodiments, it is alternatively or additionally possible, e.g., to perform a preset automatic comparison using hardware and/or to trigger an interrupt.

In further preferred embodiments, one or more counters can be provided on at least one bus of the device or the computer.

In further preferred embodiments, the counters may be used in conjunction with corresponding software (and/or hardware), e.g., to evaluate an observed allocated bandwidth and/or an (observed) latency.

Further preferred embodiments, cf. FIG. 3G, relate to a method and device for controlling a technical system, e.g., a vehicle, wherein a memory protection unit (MPU) is provided, wherein the memory protection unit is used, cf. Step 135, in particular to restrict access rights to at least one bus system of the device 200 or computer 202.

An advantage of operating a plurality of applications on a device or a computer according to further preferred embodiments is a short latency of a data exchange and a high bandwidth of the exchange; as a result, for example controllers can be computed in fewer time slots than those specified in conventional systems because the data from the other applications are available comparatively quickly.

In order to make this possible and in particular to ensure that several applications do not inadmissibly interfere with each other, further preferred embodiments propose to use an MPU within the computer or outside the computer, e.g., in the area of the bus system, to restrict access rights.

Further preferred embodiments can for example make use of the following procedure: for example, a core-external MPU is provided, e.g., in a bus interface, wherein two applications are provided, each of which runs on a core.

In further preferred embodiments, the MPU can be configured, e.g., on system startup, such that regions for writing are assigned in the local memory respectively assigned to the other core, and that regions for reading are authorized in the first memory. It is then possible, for example, for each application to read the data of the other core and locally provide data to the latter by writing, in particular without it being possible to overwrite other (memory) areas.

Accordingly, further preferred embodiments propose as follows: a method for using a memory region assignment by means of an MPU to secure a deterministic data exchange between a plurality of applications running on the computer or the device.

Accordingly, further preferred embodiments propose as follows: a method for securing deterministic memory accesses and/or data exchanges of different applications using at least one MPU. Particularly preferably, "deterministic" in this context refers to the application timing (i.e., the temporal behavior of the application(s)), and in particular not to a specific number of cycles for accessing the respective resources.

Further preferred embodiments, cf. FIG. 3H, relate to a method and device for controlling a technical system, e.g., of a vehicle, wherein at least one hardware accelerator unit HSM (FIG. 2) is used to accelerate a startup of the system or the device 200.

In modern (in particular automotive) systems, it happens that existing software of a device is replaced with other SW ("tuning"), in order e.g. to make more power available in the application (example more power, HP). A method of detecting and potentially preventing this proposes that during system boot (starting or start-up), the software code is first checked to determine whether it is the code that is to be actually executed or whether the code has been manipulated, for example in the context of a tuning action.

A method according to further preferred embodiments for checking the SW code provides that at least one checksum is determined or calculated for a specifiable memory region or the (in particular entire) memory. One problem with this can be that determining or calculating the checksum takes comparatively long, therefore extending the boot operation. In further preferred embodiments, a boot operation should be completed in e.g., 30 ms-100 ms. However, the checksum calculation may add a significant number of milliseconds.

Further preferred embodiments therefore proposed to provide at least one hardware accelerator unit HSM and use the latter to calculate the checksum(s) ("HW checksum accelerator"). Further preferred embodiments may also provide a plurality of hardware accelerator units, which may each process a part of the memory to be tested or form a checksum for the respective part. Further preferably, the checksum is calculated by means of the at least one hardware accelerator unit prior to a start of the application(s) APP1, APP2, APP3.

In further preferred embodiments, hardware accelerator units may also be assigned to different partitions or applications.

Further preferred embodiments, cf. FIG. 3I, relate to a method and a device 200 for controlling a technical system 1, e.g., a vehicle 1, wherein a mechanism, preferably in the interface of the module 208, is implemented, cf. Step 150 according to FIG. 3I, in at least one hardware module 208 or a peripheral component, the mechanism placing orders of a plurality partitions or applications APP1, APP2, APP3, which in particular cannot be overwritten or influenced by respectively other partitions or applications. Further preferred embodiments may also refer to the mechanism as "transfer window(s)."

In further preferred embodiments, the HW module (or a controller of the module, e.g., a microcontroller of the module) or the peripheral component is developed to process these orders according to a specified rule, e.g., in a round robin method, whereby advantageously a deterministic temporal behavior is produced for the (external) applications.

Further preferred embodiments provide for an implementation of Transfer Windows in at least one HW module having at least one of the following aspects:
- a) the address range of the Transfer Window can optionally be assigned to different applications/partitions,
- b) the module processes the tasks, e.g., by means of SW, according to a specifiable method, e.g., a round-robin method.

Further preferred embodiments relate to a use of the method according to the embodiments and/or the device according to the embodiments and/or the computer-readable storage medium according to the embodiments and/or the computer program according to the embodiments and/or the data carrier signal according to the embodiments for at least one of the following elements: a) enabling a deterministic runtime behavior of at least some, preferably all, applications of the device, b) avoiding a new homologation for a first application, in particular when changing at least one further application.

What is claimed is:

1. A method for controlling a technical system, the method comprising:
   resetting at least one hardware component of a device, wherein a) the device includes a plurality of cores and the resetting includes a resetting of a single core of the plurality of cores, such that the resetting of the single core does not influence one or more further cores of the plurality of cores, and/or b) a resetting of modules of the device and/or of any existing external circuits is carried out such that several independent applications can be operated and the several independent applications do not influence one another;
   wherein the method includes at least one of the following features (i)-(ii):
   (i) the method is used for at least one of the following:
      (a) enabling a deterministic runtime behavior of at least some applications of the device; and
      (b) avoiding a new homologation for one application when changing at least one further application; and
   (ii) the method further comprises at least one of the following steps:
      (a) forwarding information characterizing an operating state with regard to a functional safety of an application to at least one further unit, the at least one further unit being a unit arranged externally to the device;
      (b) at least temporarily separating partitions or applications from one another using a quality of service and/or at least one parameter characterizing the quality of service, wherein at least one application sets the quality of service, the quality of service being characterizable by latency and/or bandwidth for at least one peripheral component;
      (c) securing a deterministic data exchange between a plurality of applications running on a computer or the device using a memory region assignment implemented using at least one memory protection unit; and
      (d) placing orders by a plurality of partitions or applications which cannot be overwritten or influenced respectively by other partitions or applications using a mechanism implemented in at least one hardware module or peripheral component.

2. The method according to claim 1, wherein the technical system is a technical system of a motor vehicle or for a motor vehicle.

3. The method according to claim 1, further comprising: the
   assigning at least one memory region of a non-volatile memory, the assigning including assigning a first memory region of the non-volatile memory a first application and assigning a second memory region of the non-volatile memory to a second application.

4. The method according to claim 1, comprising:
   collecting and managing faults using a fault collection and control unit (FCCU), the FCCU being configured to ensure an independent continued operation of applications of the device, the FCCU configured to collect hardware errors occurring in individual modules and to execute fault responses.

5. The method as recited in claim 1, further comprising:
   the forwarding of the information characterizing the operating state with regard to the functional safety of the application to the at least one further unit, the at least one further unit being a unit arranged externally to the device.

6. The method according to claim 1, further comprising:
   assigning at least one peripheral module to precisely one application.

7. The method according to claim 1, further comprising:
   the at least temporarily separating partitions or applications from one another using the quality of service and/or the at least one parameter characterizing the quality of service, wherein the at least one application sets the quality of service, the quality of service being characterizable by the latency and/or bandwidth for at least one peripheral component.

8. The method according to claim 1, further comprising:
   the securing of the deterministic data exchange between the plurality of applications running on the computer or the device using the memory region assignment implemented using the at least one memory protection unit.

9. The method according to claim 1, further comprising:
   accelerating a start-up of the device using at least one hardware accelerator unit.

10. The method according to claim 1, further comprising:
    the placing of the orders by plurality of partitions or applications which cannot be overwritten or influenced respectively by other partitions or applications using the mechanism implemented in the at least one hardware module or peripheral component.

11. The method as recited in claim 1, wherein the method is used for the at least one of: (a) the enabling of the deterministic runtime behavior of the at least some applications of the device, and (b) the avoiding of the new homologation for the first application when changing the at least one further application.

12. A device for controlling a technical system of a motor vehicle, the device configured to perform a method, the method comprising:
    resetting at least one hardware component of the device, wherein a) the device includes a plurality of cores and the resetting includes a resetting of a single core of the plurality of cores, such that the resetting of the single core does not influence one or more further cores of the plurality of cores, and/or b) a resetting of modules of the device and/or of any existing external circuits is carried out such that several independent applications can be operated and the several independent applications do not influence one another;

wherein the device includes at least one of the following features (i)-(ii):
  (i) the method is used for at least one of the following:
    (a) enabling a deterministic runtime behavior of at least some applications of the device; and
    (b) avoiding a new homologation for one application when changing at least one further application; and
  (ii) the method further comprises at least one of the following steps:
    (a) forwarding information characterizing an operating state with regard to a functional safety of an application to at least one further unit, the at least one further unit being a unit arranged externally to the device;
    (b) at least temporarily separating partitions or applications from one another using a quality of service and/or at least one parameter characterizing the quality of service, wherein at least one application sets the quality of service, the quality of service being characterizable by latency and/or bandwidth for at least one peripheral component;
    (c) securing a deterministic data exchange between a plurality of applications running on a computer or the device using a memory region assignment implemented using at least one memory protection unit; and
    (d) placing orders by a plurality of partitions or applications which cannot be overwritten or influenced respectively by other partitions or applications using a mechanism implemented in at least one hardware module or peripheral component.

13. A non-transitory computer-readable storage medium on which are stored instructions for controlling a technical system of a motor vehicle, the instructions, when executed by a computer, causing the computer to perform a method, the method comprising the following steps:
  resetting at least one hardware component of a device, wherein a) the device includes a plurality of cores and the resetting includes a resetting of a single core of the plurality of cores, such that the resetting of the single core does not influence one or more further cores of the plurality of cores, and/or b) a resetting of modules of the device and/or of any existing external circuits is carried out such that several independent applications can be operated and the several independent applications do not influence one another;
wherein the non-transitory computer-readable storage medium includes at least one of the following features (i)-(ii):
  (i) the method is used for at least one of the following:
    (a) enabling a deterministic runtime behavior of at least some applications of the device; and
    (b) avoiding a new homologation for one application when changing at least one further application; and
  (ii) the method further comprises at least one of the following steps:
    (a) forwarding information characterizing an operating state with regard to a functional safety of an application to at least one further unit, the at least one further unit being a unit arranged externally to the device;
    (b) at least temporarily separating partitions or applications from one another using a quality of service and/or at least one parameter characterizing the quality of service, wherein at least one application sets the quality of service, the quality of service being characterizable by latency and/or bandwidth for at least one peripheral component;
    (c) securing a deterministic data exchange between a plurality of applications running on a computer or the device using a memory region assignment implemented using at least one memory protection unit; and
    (d) placing orders by a plurality of partitions or applications which cannot be overwritten or influenced respectively by other partitions or applications using a mechanism implemented in at least one hardware module or peripheral component.

* * * * *